Nov. 18, 1941.  H. D. HUKILL  2,262,847
CONTROL VALVE
Original Filed Aug. 7, 1936
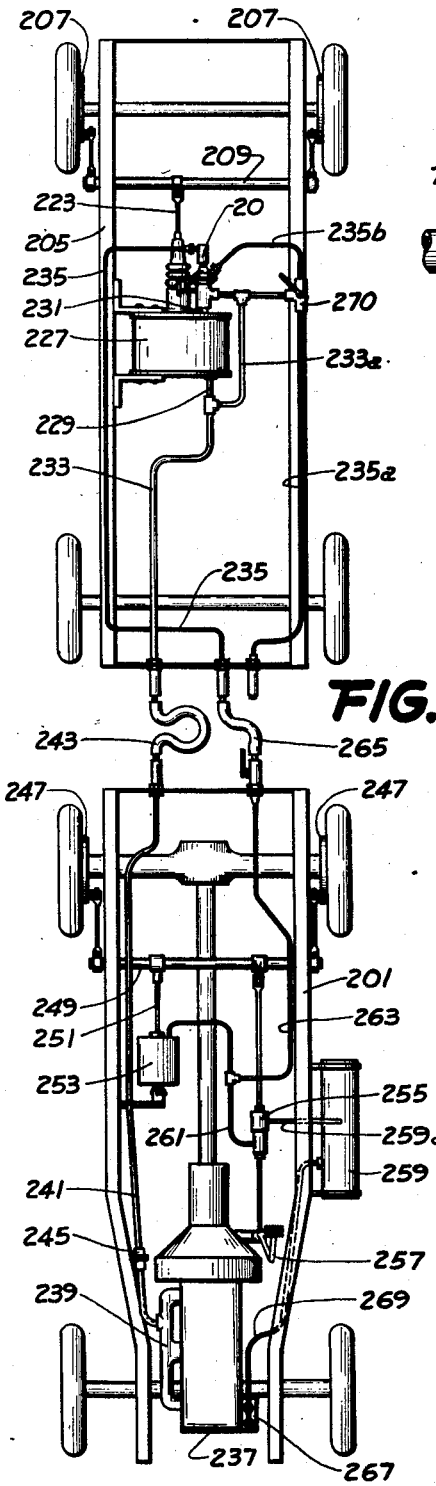
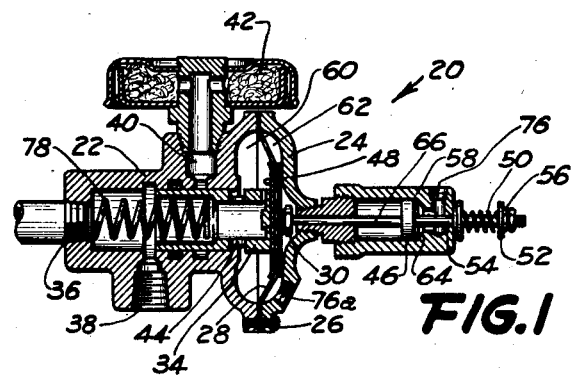
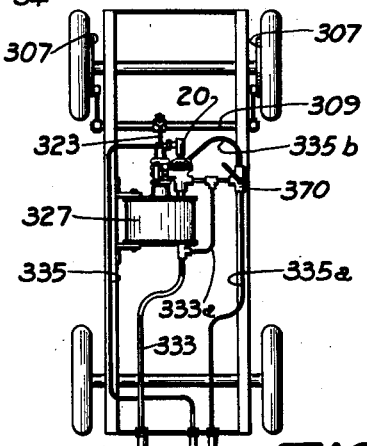
FIG.1
FIG.2
FIG.3
INVENTOR
HENRY D. HUKILL
BY
ATTORNEY Patented Nov. 18, 1941

2,262,847

UNITED STATES PATENT OFFICE 2,262,847

CONTROL VALVE

Henry D. Hukill, South Bend, Ind., assignor to Bendix Products Corporation, South Bend, Ind., a corporation of Indiana Original application August 7, 1936, Serial No. 94,838. Divided and this application July 25, 1940, Serial No. 347,359

21 Claims. (Cl. 188—3)

This invention relates to control valves and particularly to valves which are adapted to control one power motor in response to the operation of another power motor, or in response to manual control. This application is a division of my copending application No. 94,838, now Patent No. 2,212,918, dated August 27, 1940.

In the illustration of my invention, I have shown a power braking system which includes my novel control valve. It will be appreciated that valves embodying my invention may have numerous uses in addition to the control of brakes.

An object of this invention is to provide a valve which controls one power motor in response to the operation of another power motor and which can be operated alternatively by a power motor of the compressed air type or a power motor of the vacuum type.

A further object of the invention is the provision of a valve designated as a relay capable of controlling the brakes of a trailer vehicle quickly and efficiently and proportioning the power used for applying the brakes of the trailer vehicle in accordance with the power being used on an associated tractor vehicle.

Features of the invention include a relay valve provided with a diaphragm whereby the amount of operating force is controlled and provided with separate chambers to which air pressure and vacuum may be conducted, and means by which air pressure or vacuum may be conducted thereto as desired.

Further features of the invention include the provision of a followup control valve so arranged that the pressure exerted on the controlled power motor is proportional to the pressure being exerted by the operator; and the provision of means for synchronizing the power developed by the controlled power motor to correspond with the power developed for the controlling power motor.

Further objects and features of the invention should be apparent after a reading of the subjoined specification and claims and after a consideration of the accompanying drawing, in which:

Figure 1 is a view in section of a relay valve constructed according to my invention showing the valve in the position it would occupy with the brakes released;

Figure 2 is a diagrammatic view showing a tractor and trailer arrangement in which the tractor is equipped with power brakes of the compressed air type, the trailer is equipped with power brakes of the vacuum suspended type and the brakes of the two vehicles are synchronized and controlled by means of a valve of the type shown in Figure 1; and Figure 3 is a view similar to Figure 2 showing a combination in which the tractor vehicle is equipped with vacuum power brakes of the vacuum suspended type while the trailer vehicle is (like the trailer vehicle of Figure 2) also equipped with power brakes of the vacuum suspended type controlled by a valve like that shown in Figure 1.

Referring to Figure 1, it may be seen that the relay valve 20 comprises essentially a pair of casings 22 and 24 secured together by bolts such as 26. Clamped between these casings by the bolts 26 is a diaphragm 28 to which there is secured as by means of the bolt 30 and a plate 48, a tubular valve member 34 which is slidable in the casing member 22. The casing member is formed with an end port 36 arranged to be connected with the cylinder or power motor controlled by the valve, with a side port 38 arranged to be connected with the source of vacuum (normally the intake manifold) and with a port 40 arranged to be connected with the atmosphere. Threaded into the port 40 is an air cleaner 42 provided for the purpose of preventing foreign matter from being drawn into the intake manifold. As shown in Figure 1, the tubular valve member 34 in the released position of the brakes is normally retracted toward the right by the diaphragm 28 so that the port 38 is uncovered and there is communication between the vacuum port 38 and the cylinder port 36. Thus the cylinder is connected to the source of suction. When, however, the valve member 34 is moved to the left from the position shown in Figure 1 the port 38 is closed by the end of the valve member and the connection between the intake manifold and the cylinder is cut off. Further movement of the tubular member 34 to the left moves an opening 44 in the tubular member 34 into registration with the port 40 and thus allows air to enter through the air cleaner 42, the port 40, the opening 44 and the interior of the valve to the cylinder port 36, thus allowing air to enter the power cylinder to actuate the said cylinder.

The diaphragm 28 is controlled at least partially by differentials in pressure on the opposite sides thereof and at times partially by a plunger 46 which is positioned in a cylinder 58 secured to the casing 24. The plunger 46 normally bears by means of a rod 66 on the bolt 30 which secures the diaphragm to the valve member 34. The plunger 46 is itself controlled partially by a spring 50 bearing at one end on the exterior of the cylinder 58 and at the other end on a plate 52 secured to the end of an extension rod 54. The rod 54 is secured at its inner end to the plunger 46 and at its outer end has a nut 56 by which the tension of the spring 50 may be varied. The casing 22 is formed adjacent to its inner end to provide a chamber 60 just to the left of the diaphragm 28 and the casing 24 is similarly formed to provide a chamber 62 just to the right of the diaphragm 28. The cylinder 58 is formed to provide a chamber 64 formed just to the right of the plunger 46. Thus the movement of the diaphragm 28 is controlled and thereby the movement of the slidable valve element 34 is also controlled. The chamber 60 is connected at all times with the port 36 and is thus connected with the power cylinder so that the pressure in the chamber 60 is the same as that existing in the power cylinder at all times. The chamber 62 is connected with a control line when both the controlling and controlled power motors are vacuum power cylinders of the vacuum suspended type. The chamber 62 has leading therefrom a port 76a connected to the control line. The diaphragm 28 is normally urged toward the right by a light spring 78 shown most clearly in Figure 1. Thus normally the diaphragm 28 and the sliding element 34 are held toward the right (as shown) so that the cylinder outlet 36 communicates with the vacuum outlet 38. However, as soon as a greater pressure is developed in the control line this greater pressure moves the diaphragm 28 to the left, thus closing the port 38 and on continued movement to the left causes the port 40 to register with the port 44, thus allowing the air to flow in the air cleaner 42 and develop a substantially equal higher pressure in the valve casing 22 and in the cylinder controlled thereby. It is to be understood that the development of higher pressure in the control line is itself caused by allowing air to flow into the controlling power cylinder and actuate the said cylinder, and it is also to be understood that during the operation described the plunger 46 is held in the position shown in Figure 1 by the spring 50.

However, when the controlling power motor is to be actuated by pressure greater than atmospheric the chamber 62 is connected to the same suction line as is the inlet 38. It may thus be seen that the pressures in the chamber 60 and the chamber 62 remain equalized so long as the inlet 38 communicates with the interior of the valve and therefore the valve remains in the position shown until urged therefrom by some additional force. The control line is connected with the chamber 64 through a port 76 and as the controlling power motor is operated by compressed air the compressed air entering the chamber 64 moves the plunger 46 to the left moving also the valve element 34 and allowing air to flow into the controlled power cylinder. The amount of air which is allowed to flow into the controlled cylinder depends partially on the pressure in the control line and partially on the strength of the spring 50. The strength of the spring may be adjusted by the nut 56. As air flows into the casing 22, the pressure therein is increased and acts on the diaphragm to oppose the pressure in the control line until the valve is lapped. Therefore, the operation of the controlling motor is synchronized with the operation of the controlled motor.

In Figures 2 and 3 I have shown applications of my improved valve 20 to tractor and trailer brake installations.

Figure 2 shows a complete tractor and trailer arrangement in which the tractor brakes are operated by compressed air. The tractor 201 is provided with an internal combustion engine 237 of which the intake manifold 239 is connected by a conduit 241 with a flexible hose 243, in turn connected with the vacuum line 233 on the trailer 205. Intermediate the conduit 241 there is provided a check valve 245 to prevent variations in the intake manifold from affecting the vacuum developed in the power cylinder 227. The brakes 247 of the tractor vehicle are operated by means of a cross shaft 249 which is in turn normally operated through a link 251 by a power cylinder 253. The power cylinder is controlled by a valve 255 which is operated by a pedal 257 and which is arranged to connect a conduit 259a leading to a compressed air tank 259 with a conduit 261 leading to the power cylinder 253. As may be seen the conduit 261 is also connected to a conduit 263 which is coupled by a resilient hose 265 with the control line 235 on the trailer. Air under pressure is maintained in the tank 259 by means of an air pump 267 connected with the tank by means of a conduit 269.

On the trailer 205 the vacuum line 233 is connected by a branch conduit 229 with the forward end of a vacuum power cylinder 227 and by a branch conduit 233a with the control valve 20 which is connected to the rear end of said power cylinder. The power cylinder 227 is provided with a piston which is connected by a piston link 223 with a cross-shaft 209 which operates the brakes 207 of the trailer vehicle. The control line 263 is connected by a flexible conduit 265 with a control line 235 located on the trailer. The control line 235 is also connected to the valve 20. There is also provided on the trailer vehicle a vacuum control line 235a which is at times connected through a three-way valve 270 with the conduit 235b and thus to the valve 20, the valve 20 and the conduit 233a being connected alternatively with the branch conduit 235b. The conduit 235a (as shown) is not being used, but when the tractor vehicle has brakes which are controlled by vacuum (as shown in Figure 3) the control line of the tractor vehicle is connected by the flexible hose 265 with the control line 235a so as to control the valve 20 by the vacuum pressure from the tractor vehicle. It is to be understood that as shown in Figure 2, the valve 270 is so arranged as to cut off the control line 235a and to connect the conduit 233a with the line 235b.

The port 36 of the valve 20 is connected by a conduit 231 with the rear of the cylinder 227; the port 38 is connected to the conduit 233a; the port 76a is connected to the control line 235b; and the port 76 is connected to the control line 235.

When the trailer is used with an air controlled tractor vehicle the valve 270 is arranged as stated above to connect the conduit 233a with the control line 235b and to disconnect the control line 235a. It may be seen therefore that increases in pressure in the control line 263 occasioned by operation of the brakes of the tractor vehicle act upon the plunger 46 to move the diaphragm 28 to control the piston valve 34 and at the same time the negative pressure opposes the action of the air pressure on account of the connection between the suction conduit 241 through conduit 243, 233a and 235b.

In Figure 3 is shown a complete tractor and trailer combination in which the brakes on the tractor vehicle are operated by a vacuum power system of the vacuum suspended type. Like parts are designated by the same numerals as Figure 2 with the addition of 100. It may be noted, however, that in this installation no compressed air tank is needed but the vacuum conduit 341 is not only connected to the trailer power operator but is also connected to the front of the cylinder 353 by means of a conduit 371 and to the valve 355 by a conduit 373.

It is believed that the operation of my improved valve in the various systems disclosed will be clear from the above description. When the brakes on the tractor vehicle are applied by compressed air as in Figure 2, operation of the pedal 257 allows the compressed air to pass through the conduit 259a through the valve 255 and the conduit 261 to the rear of the cylinder 253 to exert force on the rod 251 and operate the cross shaft 249 to apply the brakes of the tractor vehicle. This air under pressure is also allowed to pass through the conduit 263, the flexible conduit 265, the conduit 235 and entering the control valve 20 through the port 76 passes to the chamber 64. There it acts on the plunger 46 to move the diaphragm 28 to the left and moving also the slidable element 34 allows air to pass in through the air cleaner 42 and the aligned ports 40 and 44, thence out through the port 36 and the conduit 231 into the cylinder 227. Inasmuch as the front of the cylinder 227 is connected through the conduit 233 with the source of suction, the air acting on the rear face of the piston in cylinder 227 creates a force on the piston which acting through the rod 223 applies the brakes.

The operation of the device in Figure 3 to apply the brakes of the tractor vehicle is similar to that explained above. The air entering the rear of the cylinder 353 to develop atmospheric pressure therein also develop atmospheric pressure in the conduit 363, the coupling 365, the control line 335a and entering the valve 20 through the opening 76a passes to the chamber 62. This atmospheric pressure in the chamber 62 acts on the diaphragm 28 to move the slidable valve element 34 to also allow air to enter the valve and the rear of the cylinder 327 to apply the brakes. It is to be emphasized that in this embodiment the pressure on the brakes of the trailer vehicle must correspond to the pressure applying the brakes on the tractor vehicle, because of the fact that as soon as the pressure on the brakes in the trailer vehicle equals that in the tractor vehicle the pressure in the chamber 60 will act on the diaphragm 28 to move the valve element 34 to the lapped position in which the power cylinder on the trailer vehicle is cut off both from the air and from the vacuum. Increase in pressure on the tractor vehicle will again open the valve to allow an increase in pressure on the trailer vehicle and decrease in pressure on the tractor vehicle will move the valve to the position shown in Figure 1 to release a part or all of the pressure on the trailer vahicle.

It is to be understood that the above-described embodiments and particular uses of my invention are for the purpose of illustration only and various changes may be made therein without departing from the spirit and scope of the invention. It is particularly noted that the control valve of my invention may be used in any instance where a power unit of the vacuum operated type is to be alternatively connected to and controlled by a power unit of the vacuum operated type or a power unit operated by compressed air. Therefore, it is not intended to limit the scope of my invention to the operation of brakes.

I claim:

1. For a brake system a valve provided with a casing, a valve element in said casing, a pressure responsive element controlling said valve element, means for exposing one side of said pressure responsive element to the pressure in said valve, means for conducting fluid pressure to the other side of said pressure responsive element, means for connecting a control line to said conducting means, and means for disconnecting said control line and connecting manifold vacuum to said conducting means.

2. For a brake system a valve provided with a casing, a valve element in said casing, a pressure responsive element controlling said valve element, means for exposing one side of said pressure responsive element to the pressure in said valve, means for conducting fluid pressure to the other side of said pressure responsive element, means for connecting a control line to said conducting means, means for disconnecting said control line and connecting manifold vacuum to said conducting means, and a plunger arranged to bear on said pressure responsive means.

3. For a brake system a valve provided with a casing, a valve element in said casing, a pressure responsive element controlling said valve element, means for exposing one side of said pressure responsive element to the pressure in said valve, means for conducting fluid pressure to the other side of said pressure responsive element, means for connecting a control line to said conducting means, means for disconnecting said control line and connecting manifold vacuum to said conducting means, a plunger arranged to bear on said pressure responsive means, and means for connecting said control line to bear on said plunger.

4. For a brake system having a power cylinder, a valve provided with a casing, a valve element in said casing, a pressure responsive element controlling said valve element, means for exposing one side of said pressure responsive element to the pressure in said valve, means for conducting fluid pressure to the other side of said pressure responsive element, and means for connecting a control line to said conducting means, said pressure responsive element comprising a diaphragm and said valve element comprising a slidable plunger having ports arranged to connect said power cylinder with a source of vacuum or with the atmosphere or to disconnect said power cylinder from both.

5. For a brake system a valve provided with a casing, a valve element in said casing, a pressure responsive element controlling said valve element, means for exposing one side of said pressure responsive element to the pressure in said valve, means for conducting fluid pressure to the other side of said pressure responsive element, means for connecting a control line to said conducting means, means for disconnecting said control line and connecting manifold vacuum to said conducting means, a plunger arranged to bear on said pressure responsive means, means for connecting said control line to supply pressure to bear on said plunger, a spring operatively connected to exert force on said plunger, and means for adjusting the strength of said spring.

6. For use with a system of power operated brakes for automotive vehicles comprising a differential air pressure power brake system for a tractor vehicle, a differential air pressure power brake system for a trailer vehicle, a valve comprising a movable pressure responsive element, and a movable pressure controlling element connected thereto, and formed with a plurality of separated chambers to each of which a sometimes differing pressure is connected so that said differing pressure exerts position controlling pressures on said movable elements, and an adjustable spring also arranged to exert positioning controlling pressure on said movable elements.

7. For use with a system of power operated brakes for automotive vehicles comprising a differential air pressure power brake system for a tractor vehicle, a differential air pressure power brake system for a trailer vehicle, a valve, comprising a diaphragm, and a slidable hollow piston connected to said diaphragm and arranged to open and close alternatively a connection to a source of vacuum and a connection to atmosphere, and having a plurality of separated chambers, two of which are divided by said diaphragm and to one of which a source of vacuum is connected, to another of which the controlled pressure for operating the brakes on the trailer vehicle is connected, and to another of which the controlling pressure from the tractor vehicle is connected.

8. For use with a system of power operated brakes for automotive vehicles comprising a differential air pressure power brake system for a tractor vehicle, a differential air pressure power brake system for a trailer vehicle, a valve comprising a diaphragm and having a plurality of separated chambers, two of which are divided by said diaphragm and to one of which a source of vacuum is connected, and to another of which the controlling pressure from the tractor vehicle is connected, the controlled pressure bearing a definite relation to but differing from the controlling pressure.

9. For use with a system of power operated brakes for automotive vehicles comprising a differential air pressure power brake system for a tractor vehicle, a differential air pressure power brake system for a trailer vehicle, a valve, comprising a diaphragm, and a slidable hollow piston connected to said diaphragm and arranged to open and close alternatively a connection to a source of vacuum and a connection to atmosphere, and having a plurality of separated chambers, to one of which the controlled pressure for operating the brakes on the trailer vehicle is connected, and to another of which the controlling pressure from the tractor vehicle is connected, and two of which chambers are divided by said diaphragm.

10. For use with a system of power operated brakes for automotive vehicles comprising a differential air pressure power brake system for a tractor vehicle, a differential air pressure power brake system for a trailer vehicle, a valve, comprising a diaphragm, and a slidable hollow piston connected to said diaphragm and arranged to open and close alternatively a connection to a source of vacuum and a connection to atmosphere, and having a plurality of separated chambers, two of which are divided by said diaphragm and to one of which a source of vacuum is connected, and to another of which the controlling pressure from the tractor vehicle is connected.

11. For use with a system of power operated brakes for automotive vehicles comprising a differential air pressure power brake system for a tractor vehicle and a differential air pressure power brake system for a trailer vehicle, a valve having movable valve elements, the position of the movable elements being controlled at least partially by three pressures, one of which is the pressure of vacuum in the vacuum source, a second of which is the controlling pressure, and a third of which is the controlled pressure, and one movable element comprising a slidable hollow piston arranged to open and close alternatively air and vacuum ports.

12. For use with a system of power operated brakes for automotive vehicles comprising a differential air pressure power brake system for a tractor vehicle and a differential air pressure power brake system for a trailer vehicle, a valve having movable valve elements, the position of the movable elements being controlled at least partially by three pressures, one of which is the pressure of vacuum in the vacuum source, a second of which is the controlling pressure, and a third of which is the controlled pressure, and an adjustable spring acting on said movable elements.

13. For use with a system of power operated brakes for automotive vehicles comprising a differential air pressure power brake system for a tractor vehicle, a differential air pressure power brake system for a trailer vehicle, a valve comprising a slidable hollow piston arranged to open and close alternatively, a connection to a source of vacuum and a connection to atmosphere and having a plurality of separated chambers to one of which said source of vacuum is connected, to another of which the controlled pressure for operating the brakes on the trailer vehicle is connected, and to another of which the controlling pressure from the tractor vehicle is connected.

14. For use with a system of power operated brakes for automotive vehicles comprising a differential air pressure power brake system for a tractor vehicle, a differential air pressure power brake system for a trailer vehicle, a valve comprising a diaphragm and having a plurality of separated chambers, two of which are divided by said diaphragm and to one of which a source of vacuum is connected, and to another of which the controlling pressure from the tractor vehicle is connected, and an adjustable spring acting on said valve.

15. For use with a system of power operated brakes for automotive vehicles comprising a differential air pressure power brake system for a tractor vehicle, a differential air pressure power brake system for a trailer vehicle, a valve for controlling the trailer brakes, and an adjustable spring also arranged to exert positioning controlling pressure on said valve.

16. For use with a system of power operated brakes for automotive vehicles comprising a differential air pressure power brake system for a tractor vehicle, a differential air pressure power brake system for a trailer vehicle, a valve controlled by the differential pressure on the tractor, and an adjustable spring also arranged to exert positioning controlling pressure on said valve.

17. For use with a system of power operated brakes for automotive vehicles comprising a differential air pressure power brake system for a tractor vehicle, a differential air pressure power brake system for a trailer vehicle, a valve controlling one of said systems dependent on the pressure in the other so that the controlled differential pressure bears a definite relation to but differs from the controlling pressure differential, and an adjustable spring also arranged to exert positioning controlling pressure on said valve.

18. For use with a system of power operated brakes for automotive vehicles comprising a differential air pressure power brake system for a tractor vehicle, a differential air pressure power brake system for a trailer vehicle, a valve having a movable valve element connected thereto controlling the differential pressures on the trailer and controlled by differential pressures on the tractor, the controlled pressure bearing a definite relation to but differing from the controlling pressure, and the movable element comprising a slidable hollow piston arranged to open and close alternatively air and vacuum ports.

19. For use with a system of power operated brakes for automotive vehicles comprising an air pressure power brake system for a trailer vehicle, a differential air pressure power brake system for a tractor vehicle, a valve comprising a movable pressure responsive diaphragm having one side on which air under negative pressure acts, and a slidable hollow piston controlled by said diaphragm and arranged to alternatively open and close vacuum and air ports.

20. For use with a system of power operated brakes for automotive vehicles comprising a differential air pressure power brake system for a tractor vehicle, and a differential air pressure power brake system for a trailer vehicle, a valve having a movable hollow plunger arranged to alternatively open and close a port leading to a source of vacuum and a port leading to atmosphere connected thereto and having an adjustable spring acting on said plunger.

21. For use with a system of power operated brakes for automotive vehicles comprising a differential air pressure brake system for a tractor vehicle, a differential air pressure power brake system for a trailer vehicle, a valve comprising a movable valve element, a diaphragm for controlling said movable valve element having one side on which air under negative pressure acts, and an adjustable spring element also acting on said valve element.

HENRY D. HUKILL.